US008085949B2

(12) United States Patent
Kim et al.

(10) Patent No.: US 8,085,949 B2
(45) Date of Patent: Dec. 27, 2011

(54) METHOD AND APPARATUS FOR CANCELING NOISE FROM SOUND INPUT THROUGH MICROPHONE

(75) Inventors: Kyu-hong Kim, Yonging-si (KR); Kwang-cheol Oh, Yonging-si (KR); Jae-hoon Jeong, Yonging-si (KR); So-young Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 957 days.

(21) Appl. No.: 12/076,281

(22) Filed: Mar. 14, 2008

(65) Prior Publication Data

US 2009/0141907 A1 Jun. 4, 2009

(30) Foreign Application Priority Data

Nov. 30, 2007 (KR) ........................ 10-2007-0123819

(51) Int. Cl.
*H04B 15/00* (2006.01)

(52) U.S. Cl. ...................................... 381/94.1; 381/71.1

(58) Field of Classification Search ................. 281/71.1, 281/94.1

See application file for complete search history.

(56) References Cited

U.S. PATENT DOCUMENTS

2008/0212811 A1* 9/2008 Kates ............................ 381/312
2010/0027820 A1* 2/2010 Kates ............................ 381/312

* cited by examiner

*Primary Examiner* — Marcos D. Pizarro
(74) *Attorney, Agent, or Firm* — Staas & Halsey LLP

(57) ABSTRACT

Provided is a method and apparatus for canceling noise from a sound signal input through a microphone. The method includes filtering a high-frequency signal having a frequency that is higher than a reference frequency and a low-frequency signal having a frequency that is lower than the reference frequency from input signals obtained through a microphone array, obtaining a high-frequency target signal by canceling a noise signal from the filtered high-frequency signal using a beamforming method, obtaining a low-frequency target signal by canceling a noise signal having a phase difference that is different from a phase difference of a target signal from the filtered low-frequency signal, and obtaining a sound source signal from which noise is cancelled, by synthesizing the obtained high-frequency target signal with the obtained low-frequency target signal. Thus, it is possible to accurately obtain a target sound source signal by minimizing signal distortion occurring in a low-frequency band in a digital sound obtaining apparatus having a small-size microphone array and accurately canceling or attenuating unnecessary noise.

16 Claims, 7 Drawing Sheets
(1 of 7 Drawing Sheet(s) Filed in Color)

METHOD AND APPARATUS FOR CANCELING NOISE FROM SOUND INPUT THROUGH MICROPHONE

CROSS-REFERENCE TO RELATED PATENT APPLICATION

This application claims the benefit of Korean Patent Application No. 10-2007-0123819, filed on Nov. 30, 2007, in the Korean Intellectual Property Office, the disclosure of which is incorporated herein in its entirety by reference.

BACKGROUND

1. Field

One or more embodiments of the present invention generally relates to a method, medium and apparatus for canceling noise from an input sound, and more particularly, to a method and apparatus whereby a sound source signal corresponding to interference noise is canceled from a sound that is input through a small-size digital sound obtaining apparatus having a microphone array in order to obtain only a sound source signal radiated from a target sound source.

2. Description of the Related Art

An age has emerged in which making of phone conversations, recording of external voice, or taking of moving pictures using portable digital devices is a routine. In various digital devices such as consumer electronics (CE) devices, portable phones, and digital camcorders, a microphone is used as a means for obtaining sounds. In order to implement a stereo sound using two or more channels instead of a mono sound using a single channel, a microphone array including a plurality of microphones is generally used.

The microphone array can obtain an additional feature regarding directivity, such as the direction or position of a sound to be obtained, as well as the sound itself. Directivity involves increasing sensitivity with respect to a sound source signal radiated from a sound source located in a particular direction, by using differences in time at which sound source signals arrive at a plurality of microphones of the microphone array. Thus, a sound source signal input from a specific direction can be reinforced or suppressed by obtaining the sound source signal using the microphone array.

Environment where a sound source signal is recorded or a sound signal is input through a portable digital device is more likely to include noise and neighboring interference sound and less likely to be a calm environment having no interference sound. For this reason, techniques for reinforcing a particular sound source signal required by a user from composite sounds or canceling unnecessary interference noise from the composite sounds have been developed. Recently, there has been increasing demands to accurately obtain only a sound source signal desired by a user, such as in video conference or voice recognition.

SUMMARY OF THE INVENTION

One or more embodiments of the present invention provides a method, medium and apparatus for canceling noise whereby it is possible to solve a conventional problem that unnecessary noise cannot be appropriately canceled from a sound obtained through a microphone array because of a small size of a digital sound obtaining apparatus having the microphone array and to overcome a conventional limitation that a target sound source signal cannot be accurately obtained due to the problem.

According to an aspect of the present invention, there is provided a method of canceling noise. The method includes filtering a high-frequency signal having a frequency that is higher than a reference frequency and a low-frequency signal having a frequency that is lower than the reference frequency from input signals obtained through a microphone array, obtaining a high-frequency target signal by canceling a noise signal from the filtered high-frequency signal using a beamforming method, obtaining a low-frequency target signal by canceling a noise signal having a phase difference that is different from a phase difference of a target signal from the filtered low-frequency signal, and obtaining a sound source signal from which noise is cancelled, by synthesizing the obtained high-frequency target signal with the obtained low-frequency target signal.

According to another aspect of the present invention, there is provided a computer-readable recording medium having recorded thereon a program for executing the method of canceling noise.

According to another aspect of the present invention, there is provided an apparatus for canceling noise. The apparatus includes a filtering unit filtering a high-frequency signal having a frequency that is higher than a reference frequency and a low-frequency signal having a frequency that is lower than the reference frequency from input signals obtained through a microphone array, a high-frequency target signal generation unit obtaining a high-frequency target signal by canceling a noise signal from the filtered high-frequency signal using a beamforming method, a low-frequency target signal generation unit obtaining a low-frequency target signal by canceling a noise signal having a phase difference that is different from a phase difference of a target signal from the filtered low-frequency signal, and a signal synthesis unit obtaining a sound source signal from which noise is cancelled, by synthesizing the obtained high-frequency target signal with the obtained low-frequency target signal.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail embodiments thereof with reference to the attached drawings in which.

DETAILED DESCRIPTION OF THE INVENTION

Hereinafter, embodiments of the present invention will be described in detail with reference to the accompanying drawings. In the description of the embodiments, a sound source is used as a term that means a source from which a sound is radiated, a sound pressure expresses a force exerted by acoustic energy using the physical amount of pressure, and a sound source field conceptually expresses a region affected by the sound pressure around the sound source.

Figure 1A:
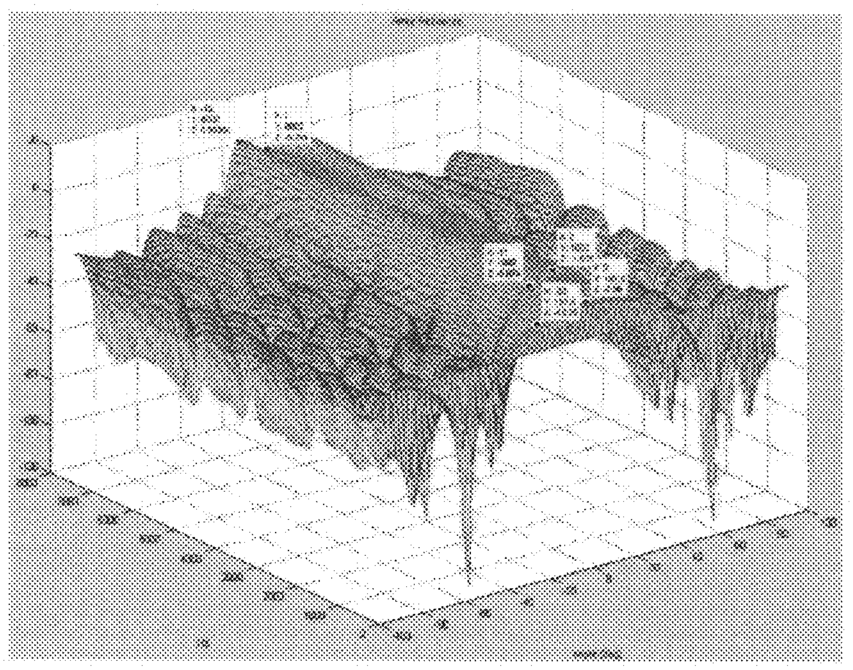
FIGS. 1A and 1B illustrate beam patterns with respect to sizes of a microphone array in order to explain a problem to be solved by the embodiments.
Figure 1B:
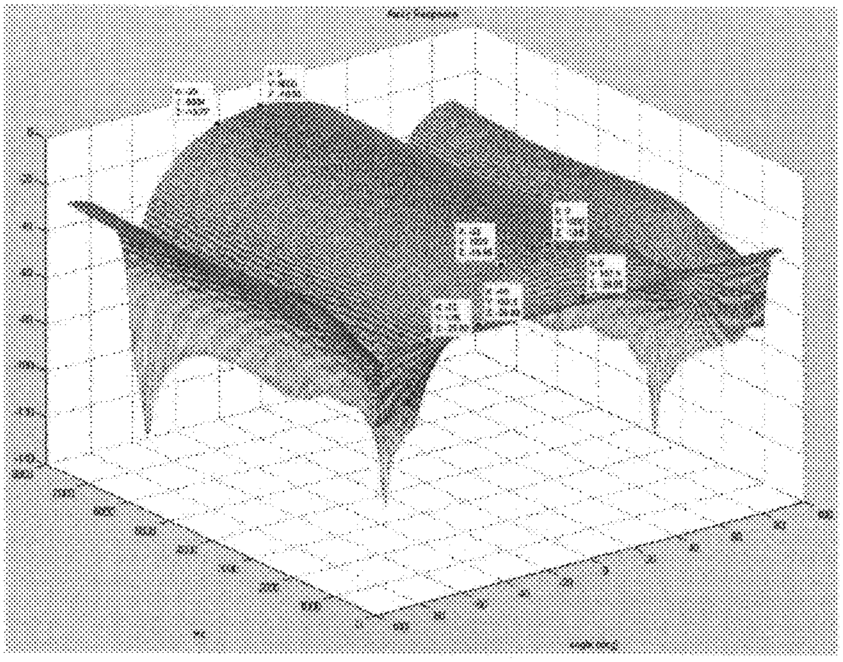

FIGS. 1A and 1B illustrate beam patterns with respect to sizes of a microphone array in order to explain a problem to be solved by the embodiments. Here, a beam pattern means a graph of measurements of electric field strengths of electromagnetic waves formed around a microphone array when a sound source field having directivity is formed using the microphone array.

As mentioned previously, a microphone array is used to make use of a directional feature of a sound, such as directivity. Generally, in order to receive a target signal mixed with background noise with high sensitivity, a microphone array functions as a filter capable of spatially reducing noise by increasing an amplitude of each signal received by the microphone array using the application of an appropriate weight to the signal when directions of a target signal and an interference noise signal are different from each other. Such a sort of spatial filter is referred to as a beamformer.

FIGS. 1A and 1B illustrate beam patterns formed in the implementation of directivity for obtaining a sound source signal radiated from a sound source located in a particular direction using the beamformer. The beam patterns illustrated in FIGS. 1A and 1B are formed for a microphone array having an aperture size of 20 cm and a microphone array having an aperture size of 3 cm, respectively. In graphs illustrated in FIGS. 1A and 1B, a vertical axis represents an array response formed by a microphone array and two horizontal axes represent a frequency and an angle with respect to the microphone array, respectively. As can be seen from FIGS. 1A and 1B, each of the graphs is symmetric to a center 0° in the horizontal angle axis. In other words, FIGS. 1A and 1B visually illustrate the degree of beamforming of the microphone arrays with respect to frequencies.

When FIGS. 1A and 1B are compared with each other, in the graph illustrated in FIG. 1A corresponding to the microphone array having an aperture size of 20 cm, beamforming is performed stably without greatly changing with frequencies in the horizontal axis. In other words, a constant array response pattern is formed regardless of a change in frequency. On the other hand, in the graph illustrated in FIG. 1B corresponding to the microphone array having an aperture size of 3 cm, the performance of beamforming degrades sharply from a frequency of about 500 Hz or lower in the horizontal axis. In the graph illustrated in FIG. 1B, a flat beam pattern is shown in a frequency interval between 0 Hz and 500 Hz.

As can be seen from the graphs illustrated in FIGS. 1A and 1B, it is known that an aperture size of a microphone array is closely related to a wavelength of an input signal. In particular, as the aperture size of the microphone array decreases, performance degradation occurs in beamforming for a low-frequency domain where the wavelength of the input signal is large. Moreover, the size of the low-frequency domain where any beam is not formed increases as the size of the microphone array decreases. For example, if a low-frequency domain where any beam is not formed ranges from 0 Hz to 500 Hz for an aperture size 3 cm of a microphone array, the low-frequency domain may extend up to 700 Hz for an aperture size 1 cm of the microphone array. Thus, in a digital sound obtaining apparatus for obtaining an external voice signal and a particular target sound source signal using a beamforming method, an aperture size of a microphone array has a direct influence upon the performance of obtaining a sound source signal.

In a small-size sound obtaining apparatus such as a portable phone or a digital camcorder carried by a user, unlike in an audio device generally used in home or recording equipment used in a professional recording studio, an aperture size of a microphone array mounted in the sound obtaining apparatus is inevitably small because of the small-size of the sound obtaining apparatus. As a result, the performance of the sound obtaining apparatus degrades in obtaining a sound source signal for a low-frequency sound source signal having a large wavelength. Consequently, signal distortion or signal dropping which does not occur in a high-frequency domain may occur when the sound source signal obtained by the sound obtaining apparatus is processed.

Embodiments of the present invention to be described will suggest an apparatus and method in which an input signal obtained through a microphone array is divided into a high-frequency band and a low-frequency band based on their frequency bands and then are processed so that a sound source signal of the low-frequency band is not distorted or dropped.

Figure 2:
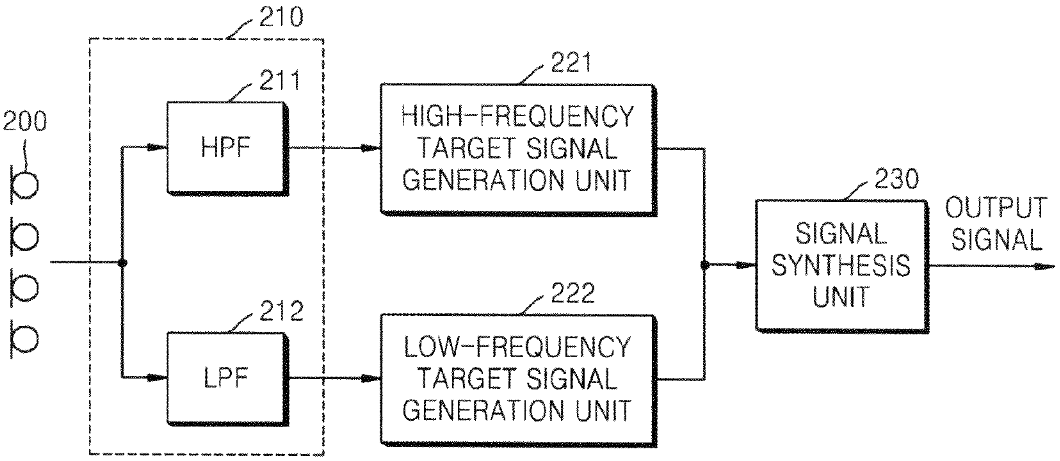
FIG. 2 is a block diagram of an apparatus for canceling noise according to an embodiment of the present invention.

FIG. 2 is a block diagram of an apparatus for canceling noise according to an embodiment of the present invention. Referring to FIG. 2, the apparatus includes a microphone array 200, a filtering unit 210 having a high-pass filter (HPF) 211 and a low-pass filter (LPF) 212, a high-frequency target signal generation unit 221, a low-frequency target signal generation unit 222, and a signal synthesis unit 230.

The microphone array 200 obtains sound source signals. A way to control the microphone array 200, e.g., the direction of a sound source or the magnitude of a sound source signal, can be designed variously according to a situation in which and a goal for which the current embodiment of the present invention is implemented.

The filtering unit 210 filters a high-frequency signal having a frequency that is higher than a reference frequency and a low-frequency signal having a frequency that is lower than the reference frequency from the input signal obtained through the microphone array 200. Here, the reference frequency means a frequency that serves as a criterion for filtering the high-frequency signal and the low-frequency signal from the input signal, and is also called a cut-off frequency. A high frequency or a low frequency is a relative concept, and it is necessary to select a frequency from the entire band of the input signal for division into a high frequency and a low frequency.

As mentioned previously, in embodiments of the present invention, the input signal is divided based on their frequency bands because beamforming is not performed properly in a low-frequency domain. Consequently, the reference frequency has to be higher than or equal to a start point of a frequency at which beamforming is not performed properly. Thus, an ideal reference frequency may be set higher than or equal to a frequency at which beamforming of an input signal obtained through the microphone array 200 results in signal distortion, in consideration of an aperture size of the microphone array 200.

The reference frequency can be adjusted according to products or environments in which the embodiments of the present invention are actually implemented. Alternatively, the reference frequency may be experimentally calculated as a particular value in advance. Alternatively, the reference frequency may be set using a separate device in consideration of an aperture size of the microphone array 200, instead of being set to a fixed value in advance.

Referring back to FIG. 2, an input signal obtained through the microphone array 200 is filtered by the HPF 211 and the LPF 212 which pass a high-frequency signal having a frequency that is higher than the reference frequency and a low-frequency signal having a frequency that is lower than the reference frequency, respectively.

When the number of individual microphones of the microphone array 200 is M, an input signal X(t) obtained through the microphone array 200 can be expressed as follows.

$$X(t)=[x_1(t)x_2(t)x_3(t)\ldots x_M(t)]^T \quad (1)$$

When pass functions of the HPF 211 and the LPF 212 are $h_{HPF}(t)$ and $h_{LPF}(t)$, respectively, the high-frequency signal and the low-frequency signal filtered by the HPF 211 and the LPF 212 can be defined as follows:

$$x_i^{hpf}(t)=x_i(t)*h_{HPF}(t)$$

$$x_i^{lpf}(t)=x_i(t)*h_{LPF}(t) \quad (2)$$

where $x_i^{hpf}(t)$ and $x_i^{lpf}(t)$ denote sound source signals filtered from an input signal obtained through an ith microphone of the microphone array 200, respectively. In the following description, a process of canceling a noise signal from the filtered high-frequency signal and the filtered low-frequency signal and a process of extracting only a target sound source signal desired by a user will be described sequentially.

The high-frequency target signal generation unit 221 obtains a high-frequency target signal by canceling a noise signal from the filtered high-frequency signal using a beamforming method. As described previously, beamforming is used to amplify or extract a sound source signal, i.e., a target signal, radiated from a sound source located in a particular direction through a microphone array. To this end, a beam pattern formed through the microphone array and signal information input to each individual microphone of the microphone array are used. Various beamforming methods such as a fixed beamforming method or an adaptive beamforming method have been introduced to obtain the signal information, and various algorithms for extracting a target signal from an input signal using the beamforming methods have been developed. Hereinafter, the adaptive beamforming method will be described by way of example with reference to FIGS. 3A and 3B. Among various adaptive beamforming methods, a generalized sidelobe canceller (GCS) algorithm, which is known as a representative adaptive beamforming method, will be introduced in the following description.

Figure 3A:
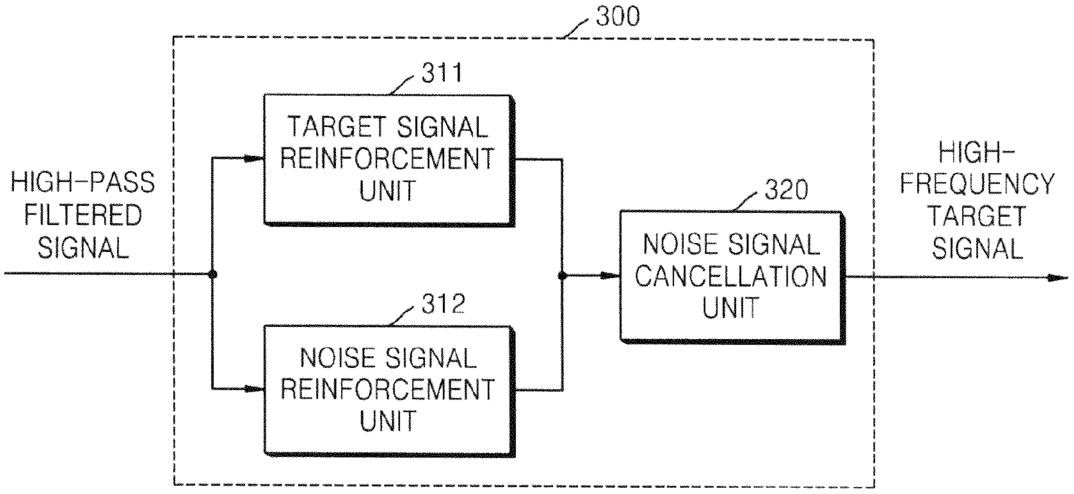
FIGS. 3A and 3B are detailed block diagrams of a high-frequency target signal generation unit of the apparatus illustrated in FIG. 2 according to an embodiment of the present invention.
Figure 3B:
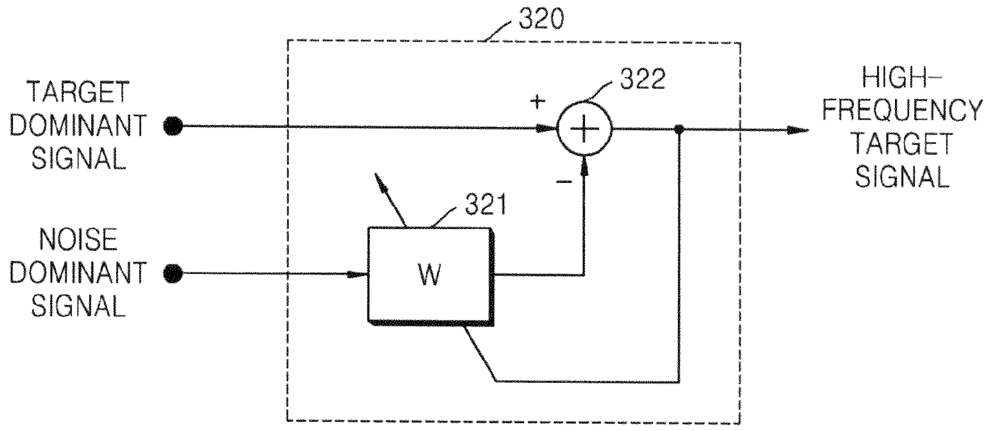

FIGS. 3A and 3B are block diagrams of a high-frequency target signal generation unit 300 in an apparatus for canceling noise according to an embodiment of the present invention. In FIGS. 3A and 3B, the high-frequency target signal generation unit 300 is illustrated based on a GSC algorithm. The GSC algorithm is an adaptive filtering method for extracting only a target signal desired by a user by canceling a noise signal from a sound source signal obtained through a microphone array. The GSC algorithm can be easily construed by those of ordinary skill in the art (Lloyd J. Griffiths and Charles W. Jim, "An alternative approach to linearly constrained adaptive beamforming", IEEE Transaction on antennas and propagation, vol. AP-30, No. 1, January 1982).

Referring to FIG. 3A, the high-frequency target signal generation unit 300 includes a target signal reinforcement unit 311, a noise signal reinforcement unit 312, and a noise signal cancellation unit 320.

The target signal reinforcement unit 311 inputs therein a high-frequency signal generated by a HPF (not shown) and reinforces a target signal from the high-frequency signal. In order to reinforce the target signal, a directivity adjustment factor, i.e., a delay, has to be adjusted so that the target signal has directivity toward a direction of a sound source that radiates the target signal. By means of such directivity adjustment, a target dominant signal is generated. The target signal reinforcement unit 311 may be implemented with a beamforming means such as a fixed beamformer.

The noise signal reinforcement unit 312 inputs therein the high-frequency signal generated by the HPF (not shown) and reinforces a noise signal from the high-frequency signal. This process is similar to the above-described process of reinforcing the target signal except that a signal that is subject to reinforcement is a noise signal instead of a sound source signal radiated from a target sound source. By means of the noise signal reinforcement unit 312, a noise dominant signal is generated. A means for reinforcing a noise signal instead of a target signal is also called a target blocker.

When the target dominant signal generated by the target signal reinforcing unit 311 and the noise dominant signal generated by the noise signal reinforcing unit 312 are implemented in the form of filters, they can be expressed as follows:

$$y_a(k) = \sum_{m=1}^{M}\sum_{l=1}^{K} a_{m,l}x_i^{hpf}(k-1) \quad (3)$$

$$y_b(k) = \sum_{m=1}^{M}\sum_{l=1}^{K} b_{m,l}x_i^{hpf}(k-1),$$

where $y_a(k)$ denotes a target dominant signal generated by the target signal reinforcing unit 311, $y_b(k)$ denotes a noise dominant signal generated by the noise signal reinforcing unit 312, M denotes the number of individual microphones of a microphone array, K denotes the number of filter tabs of channels of the microphone array, $a_{m,l}$ denotes a pass function of a beamformer, and $b_{m,l}$ denotes a pass function of a target blocker.

Although the target dominant signal and the noise dominant signal are expressed in the form of FIR filters in Equation 3, various methods of implementing a beamformer, such as multiplication of signals in a frequency domain, as well as the use of the FIR filters, can be used.

The noise signal cancellation unit 320 generates the high-frequency target signal using the target dominant signal generated by the target signal reinforcing unit 311 and the noise dominant signal generated by the noise signal reinforcing unit 312. A detailed process for the generation of the high-frequency target signal will be described with reference to FIG. 3B.

Referring to FIG. 3B, the noise signal cancellation unit 320 includes a subtraction unit 322 for noise cancellation and an adaptive filter 321. The subtraction unit 322 subtracts the noise dominant signal from the target dominant signal. The subtraction result is input to the adaptive filter 321 in order to properly adjust a noise signal to be canceled. As a result, the noise signal cancellation unit 320 outputs the high-frequency target signal from which the noise signal is canceled and which includes only a clear target signal.

In order to generate the target signal from which the noise signal is canceled, a filter coefficient has to be determined first. To this end, various cost calculation methods such as a least mean square (LMS) algorithm, a normalized least mean square (NLMS) algorithm, and a recursive least square (RLS) algorithm can be used. By using a representative LMS algorithm, a cost function can be defined as follows:

$$J(n) = E|y_{GSC}^2(n)| = E\left[\left(y_a(n) - \sum_{k=0}^{L-1} f^{(n)}(k)y_b(n-k)\right)^2\right], \quad (4)$$

where $y_{GSC}(n)$ denotes a target signal, $y_a(n)$ and $y_b(n)$ denote a target dominant signal and a noise dominant signal, respectively, and $f^{(n)}(k)$ denotes a coefficient of the adaptive filter 321. The coefficient of the adaptive filter 321 can be expressed in more detail as follows:

$$f^{(n+1)}(m) = f^{(n)}(m) - \mu \frac{\partial J(n)}{\partial f^{(n)}(m)} = f^{(n)}(m) - \mu \cdot y_{GSC}(n) y_b(n-m) (0 < \mu < 1), \quad (5)$$

where μ denotes a learning coefficient involved in convergence speed, and has a value between 0 and 1. A signal resulting from subtracting a signal filtered by the adaptive filter 321 from the target dominant signal can be expressed as follows.

$$y_{GSC}(n) = y_a(n) - \sum_{k=0}^{L-1} f^{(n)}(k)y_b(n-k) \quad (6)$$

Equation 6 means that a result of subtracting a signal obtained by filtering the noise dominant signal $y_b(n)$ from the target dominant signal $y_a(n)$ is a target signal $y_{GSC}(n)$.

The configuration of the high-frequency target signal generation unit 221 and a target signal generation process have been described so far. Next, the low-frequency target signal generation unit 222 will be described in detail.

The low-frequency target signal generation unit 222 obtains the low-frequency target signal by canceling the noise signal having a phase difference that is different from a phase difference of the target signal from the low-frequency signal filtered by the LPF 212. Unlike a general beamforming method which uses an amplitude of a sound source signal, the low-frequency target signal generation unit 222 uses a phase difference of the sound source signals that are input through a microphone array including a plurality of microphones.

In order to cancel only a noise signal from the input low-frequency signal, the low-frequency target signal generation unit 222 calculates phase differences between input signals according to frequency components of the input signals. The input signals may include a target sound source signal radiated from a sound source desired by a user and a noise signal to be canceled. If a phase difference for the target signal is known, only the target signal can be obtained by removing the remaining signals except for a signal corresponding to the phase difference for the target signal based on the calculated phase differences. This is because sound source signals having phase differences that are not the same as or are not similar to the phase difference for the target signal correspond to the noise signal.

The low-frequency target signal generation unit 222 has to previously know the phase difference for the target signal before calculating the phase differences between the input signals and canceling the noise signal. When a sound is obtained using a portable sound obtaining apparatus, it is a general feature than a target sound source is located in front of a microphone array. In this case, since input signals obtained through the microphone array have arrived at the almost same time as each other in individual microphones of the microphone array, they have little phase differences. In other words, when a target sound source is located in front of a microphone array, a target signal can be obtained by removing the remaining signals except for a signal having no phase difference between input signals.

When a target sound source is not located in front of a microphone array, if a phase difference at the moment when a sound source signal radiated from a direction in which the target sound source is located arrives at the microphone array is known in advance, a target signal can be obtained by removing the remaining sound source signals except for a sound source signal corresponding to the known phase difference. The foregoing embodiments will be described with reference to FIG. 4.

Figure 4:
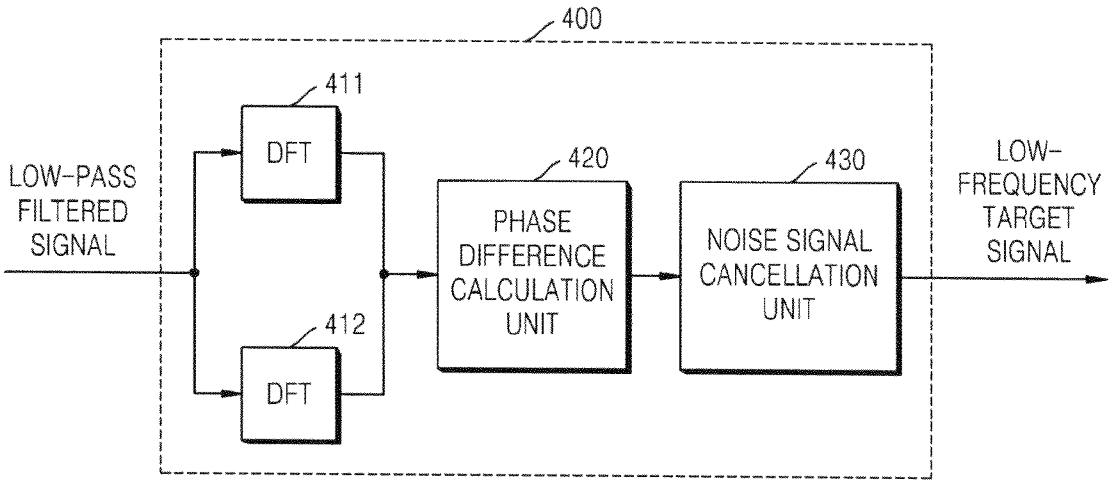
FIG. 4 is a detailed block diagram of a low-frequency target signal generation unit of the apparatus illustrated in FIG. 2 according to an embodiment of the present invention.

FIG. 4 is a detailed block diagram of a low-frequency target signal generation unit 400 in an apparatus for canceling noise according to an embodiment of the present invention. Referring to FIG. 4, the low-frequency target signal generation unit 400 includes signal transformation units 411 and 412, a phase difference calculation unit 420, and a noise signal cancellation unit 430. In the current embodiment of the present invention, it is assumed that 2 channels are selected from among a plurality of channels, i.e., individual microphones, of the microphone array in order to be used for calculation of phase differences between input signals.

The signal transformation unit 411 performs a discrete Fourier transform (DFT) on an input low-pass signal that is a signal of a time domain. In order to calculate a phase difference for each frequency component, it is necessary to transform the low-pass signal into a signal of a frequency domain.

The phase difference calculation unit 420 calculates a phase difference between input signals that are transformed by the signal transformation unit 411 for each frequency component of the input signals.

The noise signal cancellation unit 430 cancels the remaining frequency components except for a frequency component having no phase difference calculated by the phase difference calculation unit 420 from the input signal transformed by the signal transformation unit 411. This cancellation process is based on an assumption that a target sound source is located in front of a microphone array. If the target sound source is not located in front of the microphone array and is located in a particular direction, the noise signal cancellation unit 430 compares the phase difference calculated by the phase difference calculation unit 420 with a previously calculated phase difference for the target signal and cancels a frequency component having a phase difference that is different from that for the target signal from the input signal, thereby obtaining the target signal.

In noise signal cancellation, a noise signal itself may be canceled, but the noise signal may also be attenuated to a predetermined level according to an environment where embodiments of the present invention are implemented.

In the current embodiment of the present invention, 2 signals are selected from among a plurality of input signals for use in phase difference calculation. However, it may be effective to select 2 microphones at both ends from among a plurality of microphones of a microphone array. This is because a difference in time at which sound source signals radiated from sound sources arrive increases as a distance between microphones used to phase difference calculation increases, resulting in a larger phase difference.

A process in which the low-frequency target signal generation unit 222 inputs therein a low-pass signal and generates a low-frequency target signal has been described so far.

Next, the signal synthesis unit 230 generates a sound source signal from which noise is cancelled, by synthesizing the high-frequency target signal obtained by the high-frequency target signal generation unit 221 with the low-frequency target signal obtained by the low-frequency target signal generation unit 222. This process will be described with reference to FIG. 5.

Figure 5:
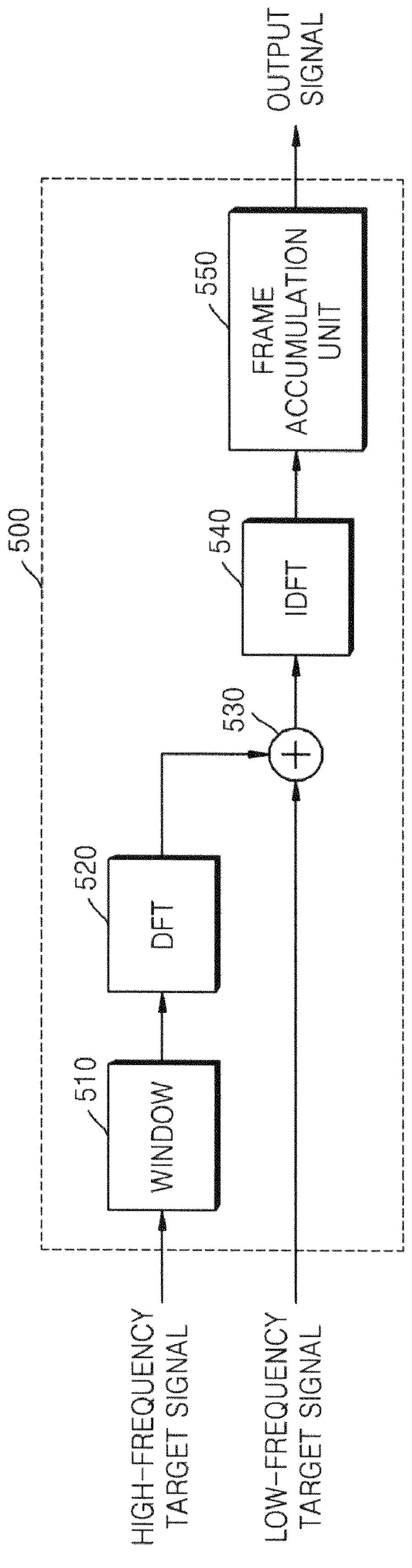
FIG. 5 is a detailed block diagram of a signal synthesis unit of the apparatus illustrated in FIG. 2 according to an embodiment of the present invention.

FIG. 5 is a detailed block diagram of a signal synthesis unit 500 in an apparatus for canceling noise according to an embodiment of the present invention. Referring to FIG. 5, the signal synthesis unit 500 includes a window function 510, a signal transformation unit 520, a synthesis unit 530, an inverse signal transformation unit 540, and a frame accumulation unit 550. While the generated high-frequency target signal is a signal of the time domain, the low-frequency target signal generated using a phase difference is a signal of the frequency domain. Thus, it is necessary to transform the high-frequency target signal into a signal of the frequency domain.

The window function 510 is a sort of filter used to divide one continuous sound source signal into unit segments called frames and process the sound source signal in units of a frame. Generally, digital signal processing uses convolution to input a signal into a system and express a generated output signal. In order to limit a given signal to a finite signal, the signal is divided into individual frames to be processed. As a representative example of window functions, a hamming window is widely used as can be easily understood by those of ordinary skill in the art.

The signal transformation unit 520 transforms frames divided by the window function 510. The synthesis unit 530 synthesizes the frequency-transformed high-frequency target signal with the generated low-frequency target signal. As a result, a signal including both a low-frequency domain and a high-frequency domain is generated. Since the generated signal is a signal of the frequency domain, the inverse signal transformation unit 540 performs an inverse DFT (IDFT) on the generated signal, thereby obtaining a signal of the time domain. The frame accumulation unit 550 accumulates the frames and sums up the accumulated frames, thereby obtaining a target signal from which a noise signal is cancelled.

The apparatus for canceling noise illustrated in FIG. 2 has been described so far. According to the current embodiment of the present invention, a high-frequency signal and a low-frequency signal are divided according to the reference frequency and a noise signal is cancelled using a phase difference between low-frequency signals, thereby accurately obtaining a target sound source signal by minimizing signal distortion occurring in a low-frequency band in a digital sound obtaining apparatus having a small-size microphone array and accurately canceling or attenuating unnecessary noise. Moreover, since cancellation of the noise signal using a phase difference is performed in real time, the apparatus according to the embodiment of the present invention can be widely used in portable digital devices.

In the following description, various embodiments of the present invention which provide additional functions based on the foregoing embodiments of the present invention will be suggested.

Figure 6:
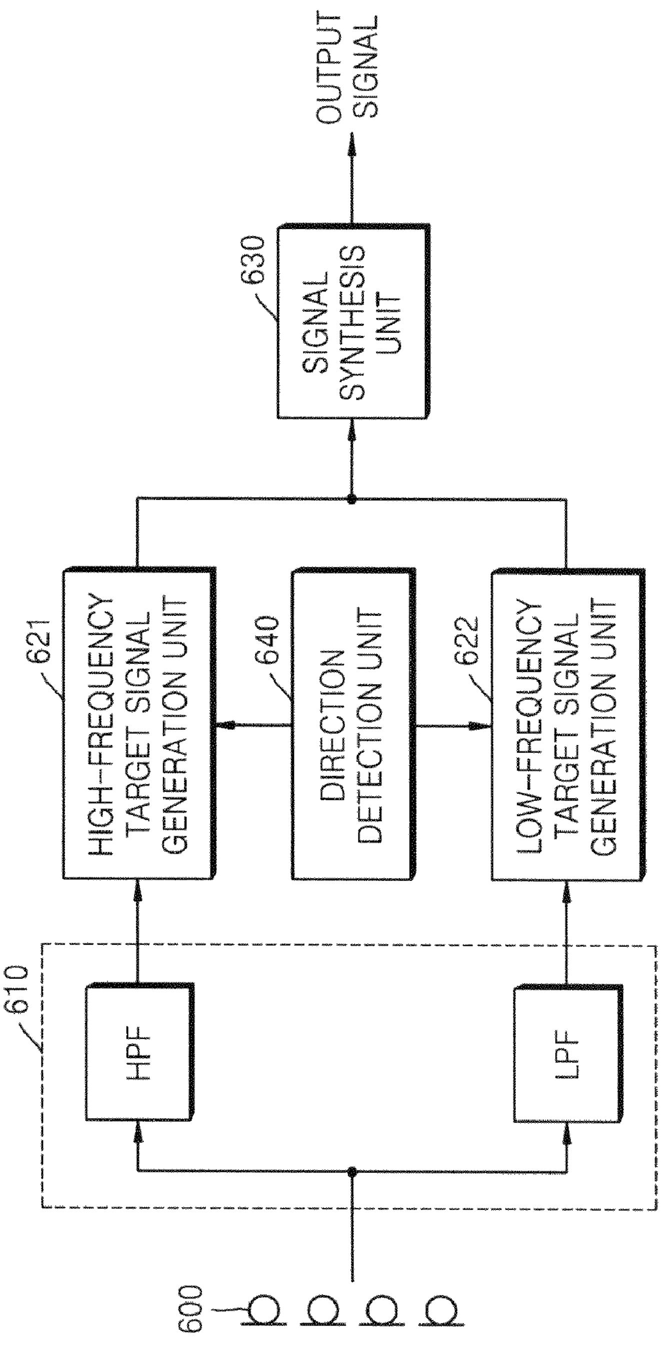
FIG. 6 is a block diagram of an apparatus for canceling noise, which includes a means for detecting a direction of a sound source, according to another embodiment of the present invention.

FIG. 6 is a block diagram of an apparatus for canceling noise, which includes a means for detecting a direction of a sound source, according to another embodiment of the present invention. The embodiment illustrated in FIG. 6 further includes a direction detection unit 640 in addition to components illustrated in FIG. 2, and thus a description will be focused on distinctive features of the direction detection unit 640.

The direction detection unit 640 detects a direction of a sound source from which input signals obtained through a microphone array 600 are radiated. In order to obtain a direction of each of sound sources for sound source signals input from the sound sources, input directions of the sound source signals are detected using time delays between the input signals. In other words, the direction detection unit 640 searches for a sound source signal having a dominant signal characteristic that a gain or a sound pressure is large from neighboring scattered sound sources, in order to detect a direction of a corresponding sound source. A method of recognizing the dominant signal characteristic may be executed by specifying a direction of a sound source having a large objective measurement value, such as a large signal to noise ratio (SNR), of a sound source signal, as a target sound source direction. For the measurement, various sound source position searching methods such as a time delay of arrival (TDOA) method, a beamforming method, and a high-resolution spectral analysis method have been introduced. Hereinafter, the sound source position searching methods will be described in brief.

According to the TDOA method, microphones of a microphone array 600 are paired for a composite sound input to the microphone array 600 from a plurality of sound sources in order to measure time delays between the microphones, and a direction of each of the sound sources is estimated based on the measured time delays. Next, the direction detection unit 640 estimates that a sound source is located at a spatial point at which the estimated sound source directions intersect for each pair of the microphones. According to the beamforming method, the direction detection unit 640 applies a delay to a sound source signal having a particular angle, scans signals on a space according to angles, and selects a position where the scanned signal value is largest as a target sound source direction, thereby estimating a position of a corresponding sound source. The position searching methods can be easily construed by those of ordinary skill in the art.

Next, the high-frequency target signal generation unit 621 regards a sound source signal radiated from a direction that is different from a target sound source direction as the noise signal based on the direction detected by the direction detection unit 640. The low-frequency target signal generation unit 622 determines a range of the noise signal based on the direction detected by the direction detection unit 640, thereby generating the low-frequency target signal from which the noise signal is cancelled. The generated high-frequency target signal and the generated low-frequency target signal are synthesized by the signal synthesis unit 630 in the same manner as in FIG. 2.

Figure 7:
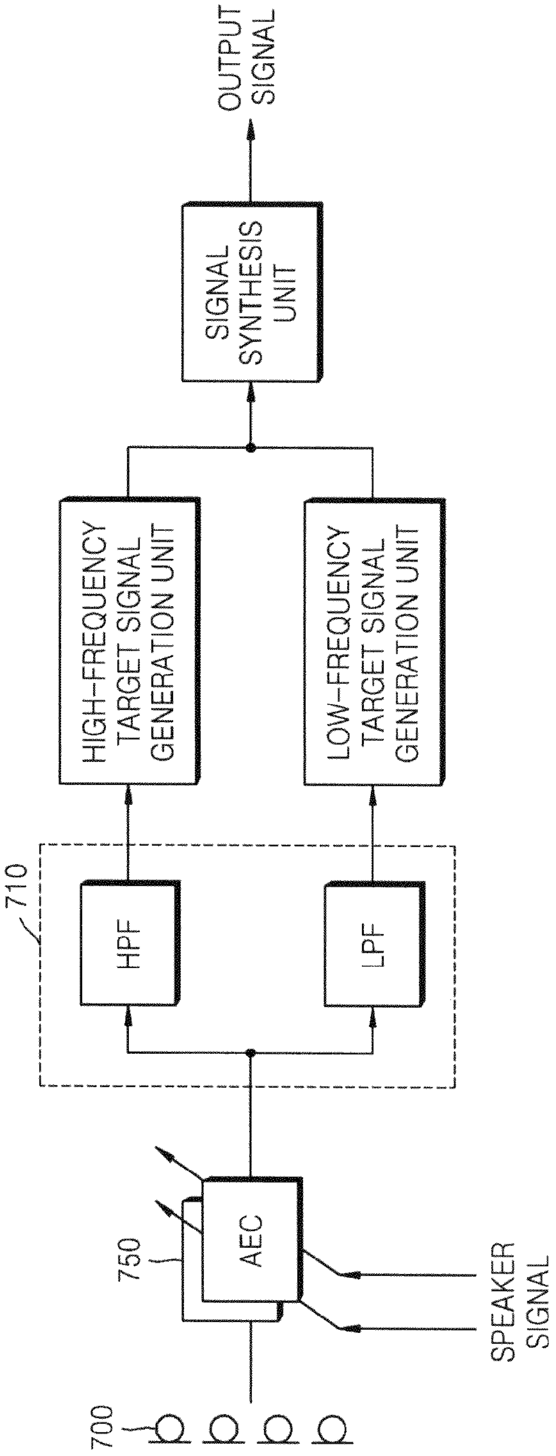
FIG. 7 is a block diagram of an apparatus for canceling noise, which includes a means for canceling an acoustic echo, according to still another embodiment of the present invention.

FIG. 7 is a block diagram of an apparatus for canceling noise, which includes a means for canceling an acoustic echo, according to still another embodiment of the present invention. The embodiment illustrated in FIG. 7 further includes an acoustic echo cancellation unit 750 in addition to components illustrated in FIG. 2, and thus a description will be focused on distinctive features of the acoustic echo cancellation unit 750.

By using a predetermined acoustic echo cancellation method, the acoustic echo cancellation unit 750 cancels an acoustic echo generated when an output sound source signal from which noise is cancelled is input through a microphone array 700. In general, when a microphone is located adjacent to a speaker, a sound output through the speaker is input to the microphone. For example, in an interactive communication, an acoustic echo is generated in which a speech uttered by a user is heard to the user as an output of a speaker of a phone. Such an acoustic echo has to be cancelled because of inconvenience caused to the user. To this end, acoustic echo cancellation (AEC) has to be performed. Hereinafter, a process of performing AEC will be described in brief.

It is assumed that a composite sound including an output sound radiated from a speaker as well as a target sound and an interference noise is input to the microphone array 700. For the acoustic echo cancellation unit 750, a specific filter may be used. The filter inputs therein an output signal, i.e., a finally generated sound source signal from which noise is cancelled, applied to a speaker (not shown) as a factor and cancels the output signal of the speaker from a sound source signal input through the microphone array 700. The filter may be an adaptive filter which is fed back with the output signal that is continuously applied to the speaker over time, and cancels an acoustic echo included in a sound source signal. For AEC, various algorithms such as an LMS algorithm, an NLMS algorithm, and an RLS algorithm have been suggested, and those of ordinary skill in the art can easily recognize an AEC method using those algorithms.

By canceling unnecessary noise such as an acoustic echo generated by an output sound radiated from a speaker and a noise signal by the apparatus for canceling noise even when a microphone and the speaker are located adjacent to each other, an accurate target signal can be obtained.

Figure 8:
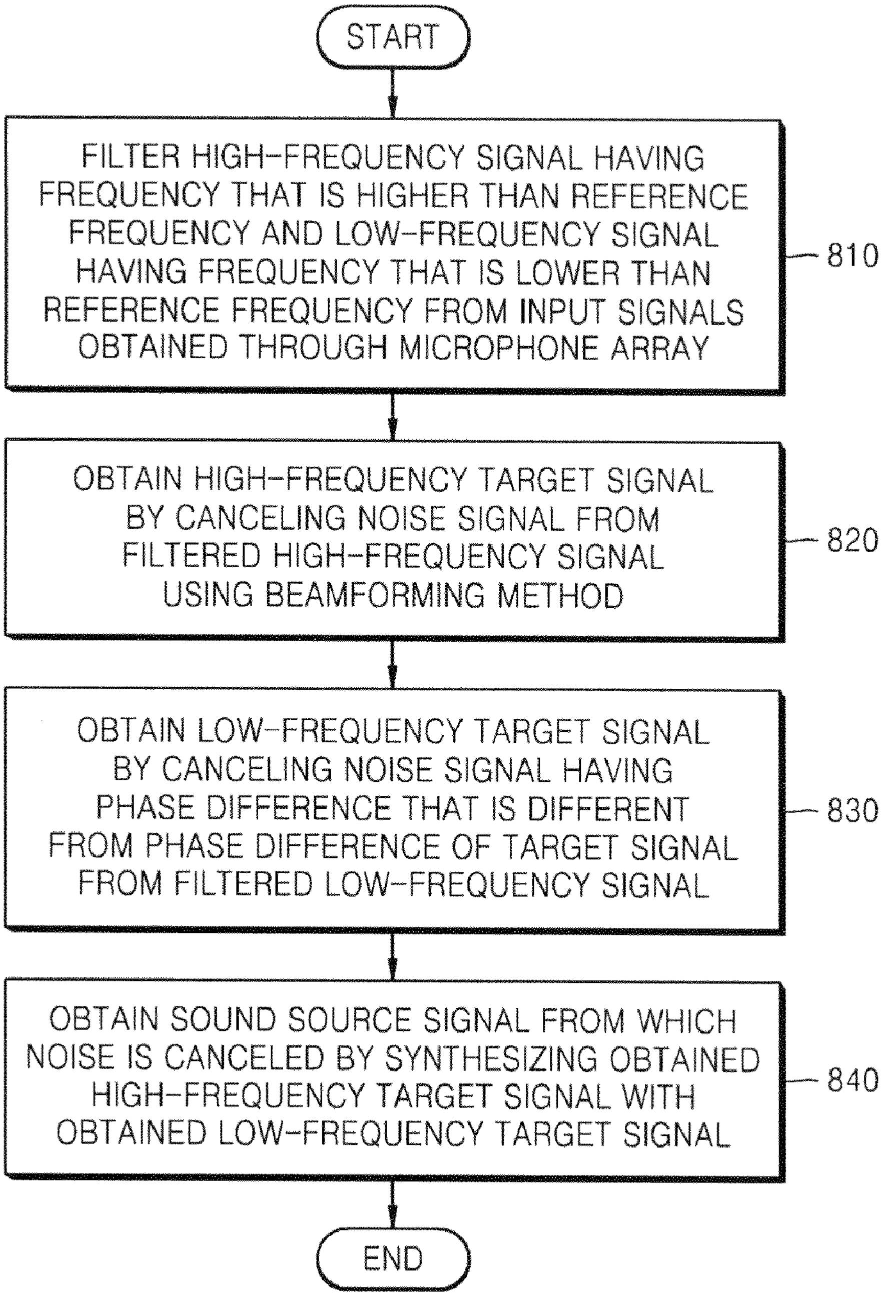
FIG. 8 is a flowchart illustrating a method of canceling noise according to still another embodiment of the present invention.

FIG. 8 is a flowchart illustrating a method of canceling noise according to still another embodiment of the present invention.

In operation 810, a high-frequency signal having a frequency that is higher than a reference frequency and a low-frequency signal having a frequency that is lower than the reference frequency are filtered from input signals obtained through a microphone array. The reference frequency may be set higher than or equal to a frequency at which signal distortion occurs when beamforming is performed on an input signal in consideration of an aperture size of the microphone array. In operation 810, the high-frequency signal and the low-frequency signal are filtered according to the set reference frequency.

In operation 820, a high-frequency target signal is obtained by canceling a noise signal from the filtered high-frequency signal using a beamforming method. The beamforming method may be a fixed beamforming method or an adaptive beamforming method as already described with reference to FIGS. 3A and 3B.

In operation 830, a low-frequency target signal is obtained by canceling a noise signal having a phase difference that is different from that for a target signal from the filtered low-frequency signal. To this end, a phase difference between the input signals is calculated for each frequency component of the input signals, and the remaining frequency components except for a frequency component that does not have the calculated phase difference are cancelled, thereby obtaining the low-frequency target signal. If a target sound source is located in a particular direction instead of in front of the microphone array, the calculated phase difference is compared with a previously calculated phase difference for the target signal and a frequency component having a phase difference that is different from that for the target signal is cancelled from an input signal, thereby obtaining the low-frequency target signal.

In operations 820 and 830, a direction of each sound source from which the input signals are radiated may also be detected in order to be used in generation of the high-frequency target signal and the low-frequency target signal.

In operation 840, the high-frequency target signal and the low-frequency target signal are synthesized with each other, thereby obtaining a sound source signal from which noise is cancelled. In operation 840, an acoustic echo generated when the sound source signal having noise cancelled therefrom is input to the microphone array may also be canceled using an AEC method described previously.

As described above, according to the embodiments of the present invention, it is possible to accurately obtain a target sound source signal by minimizing signal distortion occurring in a low-frequency band in a digital sound obtaining apparatus having a small-size microphone array and accurately canceling or attenuating unnecessary noise.

A computer-readable code on a computer-readable recording medium can be embodied. The computer-readable recording medium is any data storage device that can store data which can be thereafter read by a computer system.

Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion. Also, functional programs, code, and code segments for implementing the embodiments of the present invention can be easily construed by programmers skilled in the art.

While the present invention has been particularly shown and described with reference to embodiments thereof, it will be understood by one of ordinary skill in the art that various changes in form and detail may be made therein without departing from the spirit and scope of the present invention as defined by the following claims. Accordingly, the disclosed embodiments should be considered in a descriptive sense not in a restrictive sense. The scope of the present invention will be defined by the appended claims, and differences within the scope should be construed to be included in the present invention.

What is claimed is:

1. A method of canceling noise, the method comprising:

filtering a high-frequency signal having a frequency that is higher than a reference frequency and a low-frequency signal having a frequency that is lower than the reference frequency from input signals obtained through a microphone array;

obtaining a high-frequency target signal by canceling a noise signal from the filtered high-frequency signal using a beamforming method;

obtaining a low-frequency target signal by canceling a noise signal having a phase difference that is different from a phase difference of a target signal from the filtered low-frequency signal; and obtaining a sound source signal from which noise is cancelled, by synthesizing the obtained high-frequency target signal with the obtained low-frequency target signal.

2. The method of claim 1, wherein the obtaining of the low-frequency target signal comprises:

calculating a phase difference between the input signals for each frequency component of the input signals; and canceling the remaining frequency components except for a frequency component which does not have the calculated phase difference from the input signals.

3. The method of claim 1, wherein the obtaining of the low-frequency target signal comprises:

calculating a phase difference between the input signals for each frequency component of the input signals; and comparing the calculated phase difference with a previously calculated phase difference for the target signal and canceling a frequency component having a phase difference that is different from the phase difference for the target signal from the input signals.

4. The method of claim 1, further comprising, by considering an aperture size of the microphone array, setting the reference frequency to a frequency higher than or equal to a frequency at which signal distortion occurs when beamforming is performed on the input signals, wherein the filtering of the high-frequency signal and the low-frequency signal is performed based on the set reference frequency.

5. The method of claim 1, wherein the beamforming method is one of a fixed beamforming method and an adaptive beamforming method.

6. The method of claim 1, further comprising detecting a direction of a sound source from which the input signals are radiated, wherein the obtaining of the high-frequency target signal comprises regarding a sound source signal radiated from a direction that is different from a direction of a target sound source as the noise signal based on the detected direction, and the obtaining of the low-frequency target signal comprises determining a range of the noise signal based on the detected direction.

7. The method of claim 1, further comprising canceling an acoustic echo generated when the sound source signal having noise cancelled therefrom is input to the microphone array, by using a predetermined acoustic echo cancellation (AEC) method.

8. A computer-readable recording medium having recorded thereon a program for executing the method of claim 1.

9. An apparatus for canceling noise, the apparatus comprising:

a filtering unit filtering a high-frequency signal having a frequency that is higher than a reference frequency and a low-frequency signal having a frequency that is lower than the reference frequency from input signals obtained through a microphone array;

a high-frequency target signal generation unit obtaining a high-frequency target signal by canceling a noise signal from the filtered high-frequency signal using a beamforming method;

a low-frequency target signal generation unit obtaining a low-frequency target signal by canceling a noise signal having a phase difference that is different from a phase difference of a target signal from the filtered low-frequency signal; and a signal synthesis unit obtaining a sound source signal from which noise is cancelled, by synthesizing the obtained high-frequency target signal with the obtained low-frequency target signal.

10. The apparatus of claim 9, wherein the low-frequency target signal generation unit comprises:

a phase difference calculation unit calculating a phase difference between the input signals for each frequency component of the input signals; and a noise signal cancellation unit canceling the remaining frequency components except for a frequency component which does not have the calculated phase difference from the input signals.

11. The apparatus of claim 9, wherein the low-frequency target signal generation unit comprises:

a phase difference calculation unit calculating a phase difference between the input signals for each frequency component of the input signals; and a noise signal cancellation unit comparing the calculated phase difference with a previously calculated phase difference for the target signal and canceling a frequency component having a phase difference that is different from the phase difference for the target signal from the input signals.

12. The apparatus of claim 9, further comprising a reference frequency setting unit, by considering an aperture size of the microphone array, setting the reference frequency to a frequency higher than or equal to a frequency at which signal distortion occurs when beamforming is performed on the input signals, wherein the filtering unit filters the high-frequency signal and the low-frequency signal based on the set reference frequency.

13. The apparatus of claim 9, wherein the beamforming method is one of a fixed beamforming method and an adaptive beamforming method.

14. The apparatus of claim 9, further comprising a direction detection unit detecting a direction of a sound source from which the input signals are radiated, wherein the high-frequency target signal generation unit regards a sound source signal radiated from a direction that is different from a direction of a target sound source as the noise signal based on the detected direction, and the low-frequency target signal generation unit determines a range of the noise signal based on the detected direction.

15. The apparatus of claim 9, further comprising an acoustic echo cancellation unit canceling an acoustic echo generated when the sound source signal having noise cancelled therefrom is input to the microphone array, by using a predetermined acoustic echo cancellation (AEC) method.

16. The apparatus of claim 9, wherein the low-frequency target signal generation unit calculates the phase difference between input signals obtained through 2 microphones located at both ends from among a plurality of microphones of the microphone array.

* * * * *

UNITED STATES PATENT AND TRADEMARK OFFICE

CERTIFICATE OF CORRECTION

PATENT NO. : 8,085,949 B2
APPLICATION NO. : 12/076281
DATED : December 27, 2011
INVENTOR(S) : Kim et al.

It is certified that error appears in the above-identified patent and that said Letters Patent is hereby corrected as shown below:

Title Page Col. 1, Item (75) (Inventors), Line 1, Delete "Yonging-si (KR);" and insert -- Yongin-si (KR); --, therefor.

Title Page Col. 1, Item (75) (Inventors), Line 2, Delete "Yonging-si (KR)," and insert -- Yongin-si (KR); --, therefor.

Title Page Col. 1, Item (75) (Inventors), Line 3, Delete "Yonging-si (KR);" and insert -- Yongin-si (KR); --, therefor.

Signed and Sealed this
Twenty-ninth Day of May, 2012

David J. Kappos
*Director of the United States Patent and Trademark Office*